United States Patent
Milliken et al.

(10) Patent No.: US 6,526,062 B1
(45) Date of Patent: Feb. 25, 2003

(54) SYSTEM AND METHOD FOR SCHEDULING AND RESCHEDULING THE TRANSMISSION OF CELL OBJECTS OF DIFFERENT TRAFFIC TYPES

(75) Inventors: Walter C. Milliken, Dover, NH (US); Steven Kohalmi, Newton, MA (US); Philip P. Carvey, Bedford, MA (US); Ronald L. Pettyjohn, Concord, MA (US); Stanley P. Sassower, Burlington, MA (US); Craig Partridge, El Cerrito, CA (US)

(73) Assignees: Verizon Corporate Services Group Inc., New York, NY (US); Genuity Inc., Burlington, MA (US)

( * ) Notice: Subject to any disclaimer, the term of this patent is extended or adjusted under 35 U.S.C. 154(b) by 0 days.

(21) Appl. No.: 09/170,609

(22) Filed: Oct. 13, 1998

(51) Int. Cl.$^7$ .......................... H04L 12/28; H04L 12/56
(52) U.S. Cl. ................ 370/395.42; 370/230; 370/412
(58) Field of Search ............................ 370/229, 230, 370/230.1, 231, 232, 235, 395.1, 395.6, 395.3, 395.4, 395.41, 395.42, 395.43, 412, 413, 414, 468

(56) References Cited

U.S. PATENT DOCUMENTS

| | | | | |
|---|---|---|---|---|
| 5,533,020 A | | 7/1996 | Byrn et al. | |
| 5,748,614 A | * | 5/1998 | Wallmeier | 370/395.41 |
| 5,793,747 A | * | 8/1998 | Kline | 370/230 |
| 5,940,397 A | * | 8/1999 | Gritton | 370/412 |
| 6,018,527 A | * | 1/2000 | Yin et al. | 370/395.41 |
| 6,226,262 B1 | * | 5/2001 | Sterne et al. | 370/231 |

* cited by examiner

*Primary Examiner*—Ajit Patel
*Assistant Examiner*—Bob A. Phunkulh
(74) *Attorney, Agent, or Firm*—Leonard Charles Suchyta; James K. Weixel (57) ABSTRACT

A computer system for transmitting packets includes a manager and scheduling elements for managing the transmission of the packets over one or more logical channels. The computer system can prioritize the transmission of packets based on the type of traffic and maintain quality of service (QoS) characteristics associated with a logical channel. In addition, the computer system can execute a threading process to ensure the efficient and timely transmission of certain types of packets without using any complex mathematical operations.

23 Claims, 9 Drawing Sheets

SYSTEM AND METHOD FOR SCHEDULING AND RESCHEDULING THE TRANSMISSION OF CELL OBJECTS OF DIFFERENT TRAFFIC TYPES

BACKGROUND OF THE INVENTION

A. Field of the Invention

The present invention relates generally to systems for transmitting information over the Internet, and more particularly to scheduling the transmission of different types of traffic over the Internet.

B. Description of the Related Art

With the advent of highly-sophisticated digital audio and video applications run on modern multimedia workstations, the ability to run these applications over the Internet has become more desirable. However, such real-time applications often do not work well across the Internet because of variable queuing delays and congestion losses, and because the Internet, as conceived, offers only a very simple point-to-point, best-effort data delivery. As a result, before real-time applications, such as remote video and multimedia conferencing, can be broadly used, the Internet infrastructure must be modified to support real-time quality of service (QoS), which provides some control over end-to-end packet delays.

Another problem with respect to communication over the Internet involves the communication lines. Long haul communications lines are very expensive to use, and major customers usually contract to pay for the use of these lines according to the amount of "time" they wish to have access to these lines rather than by the amount of traffic they send over them. Consequently, it is very important that these customers make the most efficient use of these lines. To make efficient use of these lines, it is desirable to provide requested/specified asynchronous transfer mode (ATM) QoS for many thousands of virtual channels (VCs) all using the same physical port. In other words, a network should be optimally setup so that traffic meets the specified QoS parameters of any portion of the network.

This setup results in a very large VC cell scheduling problem when some number of VCs have cells available at a network interface for transmission onto the Internet at the same time. These VCs could support constant bit rate (CBR) type traffic, variable bit rate (VBR) traffic, or unspecified bit rate (UBR) traffic. These traffic terms are described in the ATM Forum UNI 4.0 Specification, which also describes other traffic types in addition to CBR, VBR and UBR, such as adjustable bit rate (ABR). When a number of cells arrive at the network interface at the same time, a problem arises with respect to determining the priority in which each of the cells of the various VCs should be scheduled for transmission.

For small numbers of VCs, individual processes implementing the Leaky Bucket algorithm may be implemented for each VC. This algorithm, however, is impractical for large numbers of VCs.

With respect to the Internet protocol (IP) QoS problem, prior art solutions have implemented multiple logical FIFOs to handle variously prioritized packets, typically referred to as "priority queuing." The queue with the highest priority traffic would always be checked first for an available packet to send and when this queue was emptied, the next priority queue would be checked for available packets to send, and so forth. Such a priority queuing arrangement, however, does not guarantee service to every packet because high priority traffic can "lock out" low priority traffic indefinitely. In contrast, by giving, for example, all users in a packet-scheduling scheme the same priority, but treating the queues in a round robin fashion, packet scheduling guarantees each user a particular committed amount of bandwidth with which other users cannot interfere. Alternatively, each user can have a variable priority based on whether the user has been under or over-utilizing their guaranteed bandwidth. The weighted fair queuing (WFQ) algorithm provides such a scheme.

SUMMARY OF THE INVENTION

A system consistent with the present invention is event driven, the events being packet arrivals and indications of new cell times. Cells are scheduled for transmission one at a time using time-based queues. For VBR traffic, two variables are maintained for each VBR logical channel that represent time values, scheduled departure time (SDT) and theoretical departure time (TDT). These variables are used to calculate queue times for VBR cells that must be rescheduled.

A system consistent with the present invention for scheduling the transmission cells of packet objects, each packet object including at least one cell and associated with a logical channel index (LCI) identifying the logical channel over which a packet object is to be transmitted, said computer system includes at least one memory for storing the packet objects, for storing a queue time (QT) for each packet object, and for storing one of a plurality of traffic types for each packet object, at least one of the traffic types being a predetermined traffic type, a queue manager for enqueuing the packet objects into said memory, and at least one scheduling element for determining the transmission time for each LCI of the predetermined traffic type enqueued in said memory and for rescheduling an LCI of the predetermined traffic type having at least one cell that is not transmitted at its corresponding transmission time.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments consistent with the invention and, together with the description, explain the advantages and principles of the invention. In the drawings.

DETAILED DESCRIPTION OF THE INVENTION

Reference will now be made to preferred embodiments of this invention, examples of which are shown in the accompanying drawings and will be obvious from the description of the invention. In the drawings, the same reference numbers represent the same or similar elements in the different drawings whenever possible.

Figure 1:
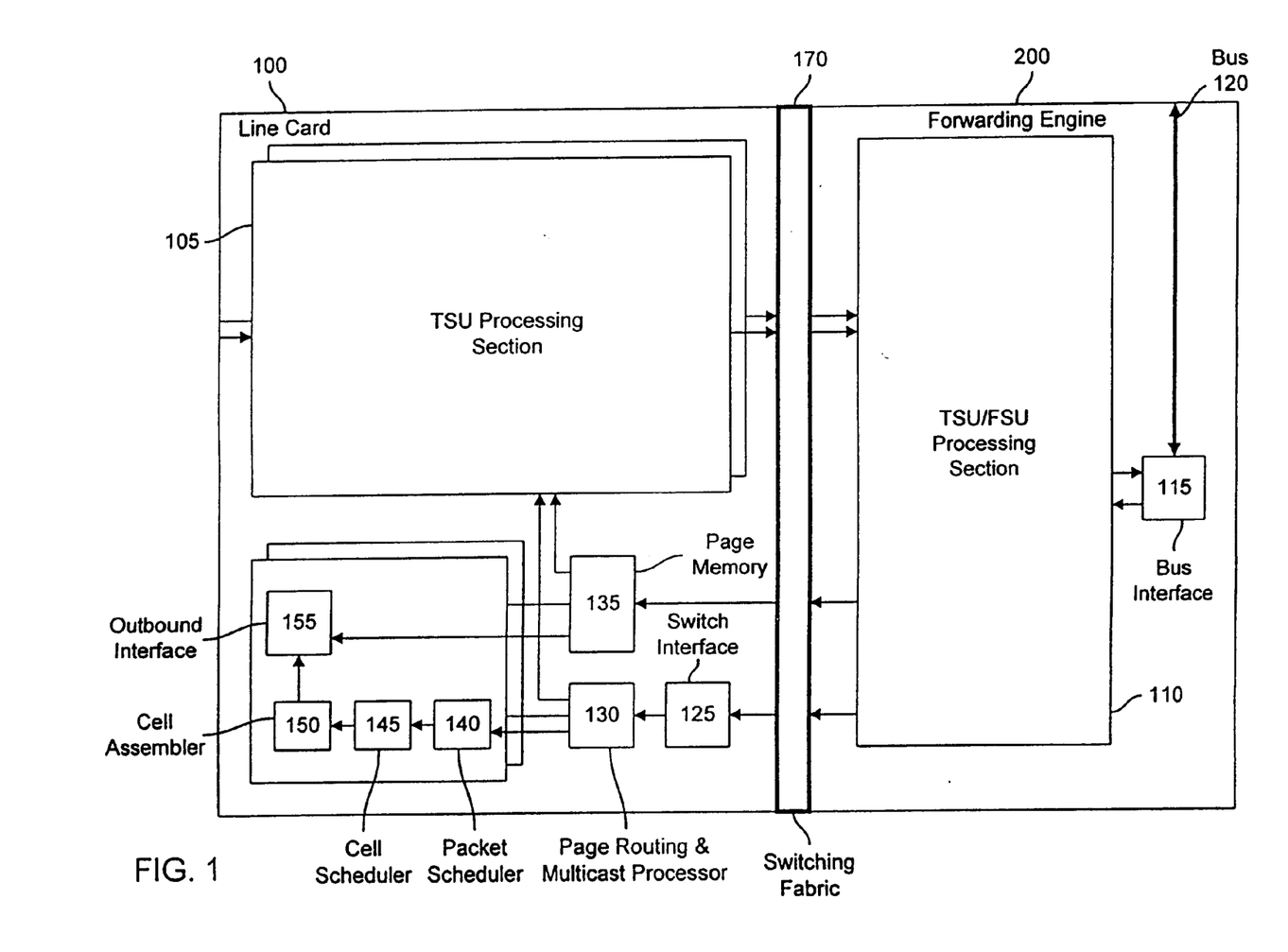
FIG. 1 is a block diagram of a data flow management system consistent with the present invention.

FIG. 1 shows a block diagram of a data flow management system consistent with the present invention. The data flow management system includes a line card 100, a forwarding engine 200 and a switching fabric 170 coupling line card 100 to forwarding engine 200. Line card 100 includes a to switch unit (TSU) processing section 105, a from switch unit (FSU) page receipt and switch interface 125, an FSU page routing and multicast processor 130, an FSU page memory 135, an FSU packet scheduler 140, an FSU cell scheduler 145, an FSU cell assembler 150, and an outbound interface 155. Forwarding engine 200 includes a TSU/FSU processing section 110, a bus interface 115 and a bus 120. The data flow management system can be used for a router.

TSU processing section 105 receives traffic, for example, from the Internet and passes the received traffic to TSU/FSU processing section 110 via switching fabric 170. After processing the received traffic, TSU/FSU processing section 110 forwards the traffic to switch interface 125, which forwards the outbound traffic to FSU page routing and multicast processor 130. In addition, packet and updated header information is passed from TSU/FSU processing section 110 to FSU page memory 135. Generally, packet scheduler 140 receives packet traffic and operates on the packet traffic to calculate relative times at which each of the packets will be transmitted. The packets are then sorted by transmission order and passed to cell scheduler 145 in the form of packet objects. Cell scheduler 145 assigns absolute transmission times to the received objects and queues them for transmission at these absolute times. Cell assembler 150 receives the transmitted packet objects one cell at a time, encapsulates each cell with necessary header information and passes each cell to the outbound interface 155 for transmission over a network.

Figure 2:
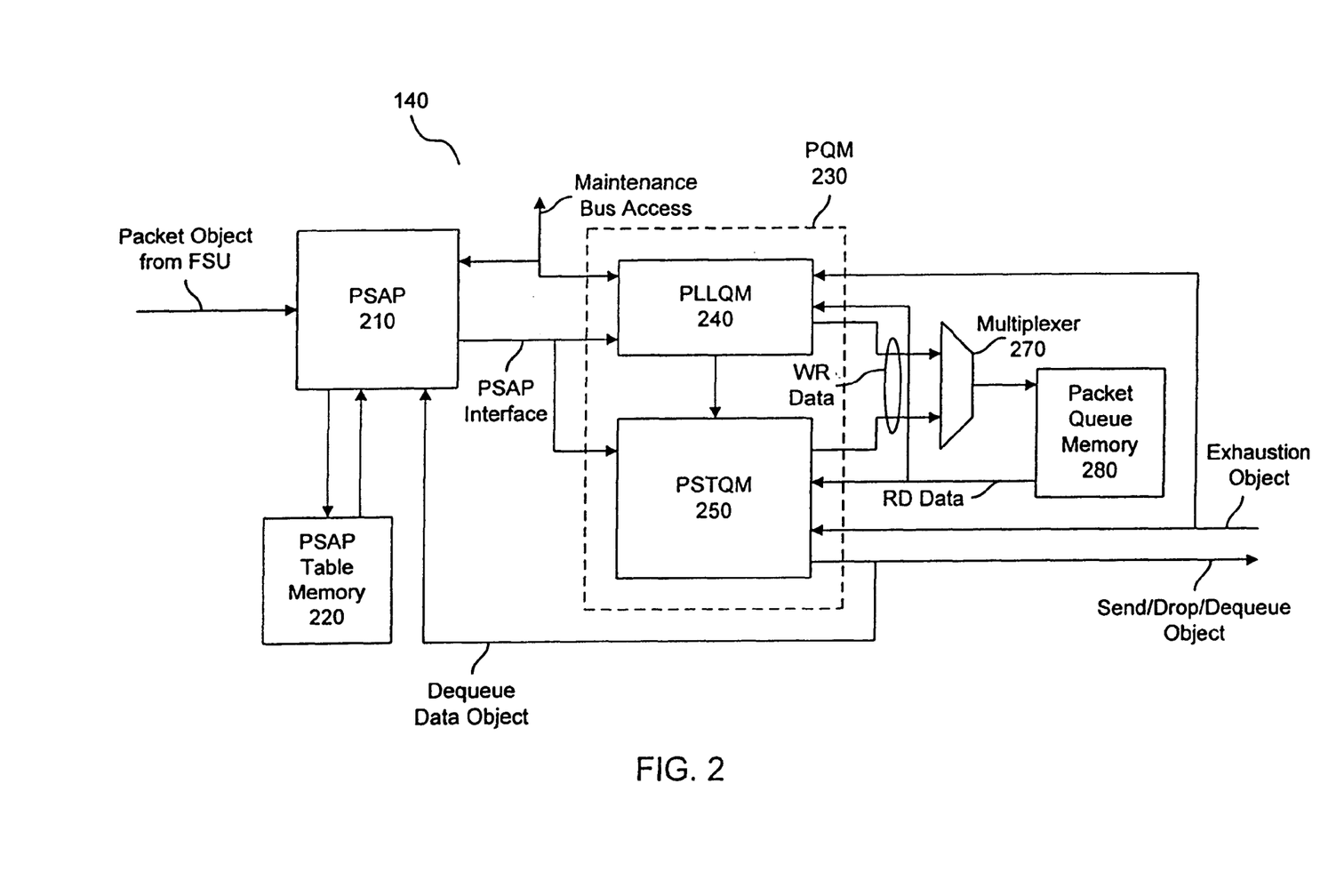
FIG. 2 is a block diagram of the packet scheduler of the data flow management system of FIG. 1.

FIG. 2 is a block diagram of packet scheduler 140 showing all of its major functional elements and signal flow between those elements. A packet schedule algorithm processor (PSAP) 210 receives packet objects from FSU page routing and multicast processor 130 and performs per-packet processing for every packet sent out. A PSAP table memory 220 contains parameters and state information used by PSAP 210 to process the packets. This memory is used primarily to keep tables for each flow, such as destination tag (dtag) information, and for each logical channel index/identifier (LCI). PSAP 210 sends packet objects to a packet queue manager (PQM) 230 for queuing or to be discarded via the PSAP interface.

PQM 230 is composed of two queues, a packet linked list queue manager (PLLQM) 240 and a packet sorted tree queue manager (PSTQM) 250. Each queue can be implemented, for example, as a field programmable gate array (FPGA). Other implementations include application specific integrated circuits (ASICs). PLLQM 240 receives packet objects from PSAP 210 that are associated with "Best Effort" traffic and normal cell bridging traffic, while PSTQM 250 receives packet objects from PSAP 210 that are associated with QoS traffic and certain operation and maintenance functions. Based on information generated by PSAP 210 and exhaustion signals received from cell scheduler 145, PSTQM 250 and PLLQM 240 operate to enqueue and dequeue packet objects into and out of a packet queue memory 280 via address/WR data lines. PLLQM 240 and PSTQM 250 share packet queue memory 280 through a multiplexer 270.

Figure 3:
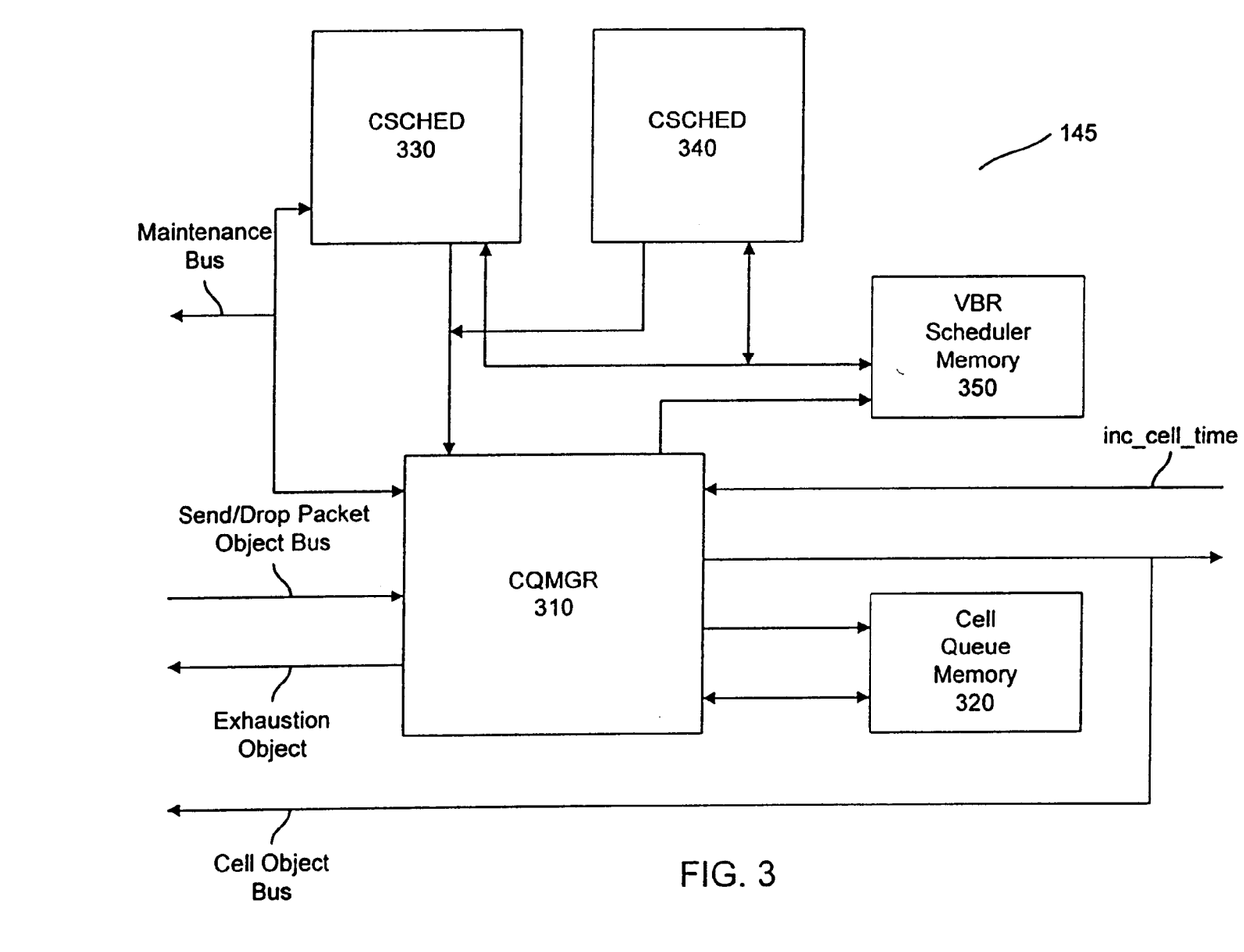
FIG. 3 is a block diagram of the cell scheduler of the data flow management system of FIG. 1.

FIG. 3 is a block diagram of cell scheduler 145 showing all the major functional elements and the interconnecting signals. A CQMGR 310 receives packet objects from packet scheduler 140 via the send/drop (S/D) packet object bus. Each packet object includes one or more cells. CQMGR 310 executes several functions including placing packet objects into an LCI database located in a cell queue memory 320, identifying the traffic types (e.g., CBR, VBR, and UBR) associated with the packet object, enqueuing incoming packet objects, and controlling VBR and UBR dynamic linked queues. The transmission time of CBR LCIs is predetermined by the NP using a static time queue. Cell queue memory 320 stores CBR time queue (TQ) information, VBR TQ information, LCI control and status information, and a packet object queue for each LCI.

Cell scheduler 145 also includes two VBR cell schedule algorithm (CSCHED) elements 330 and 340. Each of these elements represents a dual instance of a generic cell rate algorithm (GCRA) used to calculate queue times (QT) for LCIs of VBR traffic. The GCRA is described in the ATM Forum UNI 4.0 Specification. The GCRA calculates an index value which represents the QT. In general, one of CSCHEDs 330 and 340 is used for initial scheduling of a newly active LCI, and the other is used for rescheduling of an already active LCI. A VBR scheduler memory 350 stores traffic type and packet scheduling type information (used to direct exhaustion objects onto one of two queues in packet scheduler 140) for all LCIs.

In the CBR TQ, each entry corresponds to a specific and increasing cell time slot, and contains an LCI, which points to an entry in the LCI data structures. The VBR TQ is similar to the CBR TQ, but each time slot can preferably point to multiple entries in the LCI data structures by pointing to a linked list of LCIs. The CBR TQ can also be implemented in the same manner as the VBR TQ. A UBR queue only has a single slot, which can contain a linked list of LCIs. Since an LCI can be only one of the three traffic types, each LCI is only pointed to by one of the three queue types. The LCI data structures hold information for each LCI, and comprises information from several disjoint databases including the traffic type (CBR, VBR or UBR) and packet scheduling type (linked list or sorted tree) in VBR Scheduler Memory 350, as well as the LCI control and status information and a packet object FIFO for each LCI in cell queue memory 320.

Figure 4:
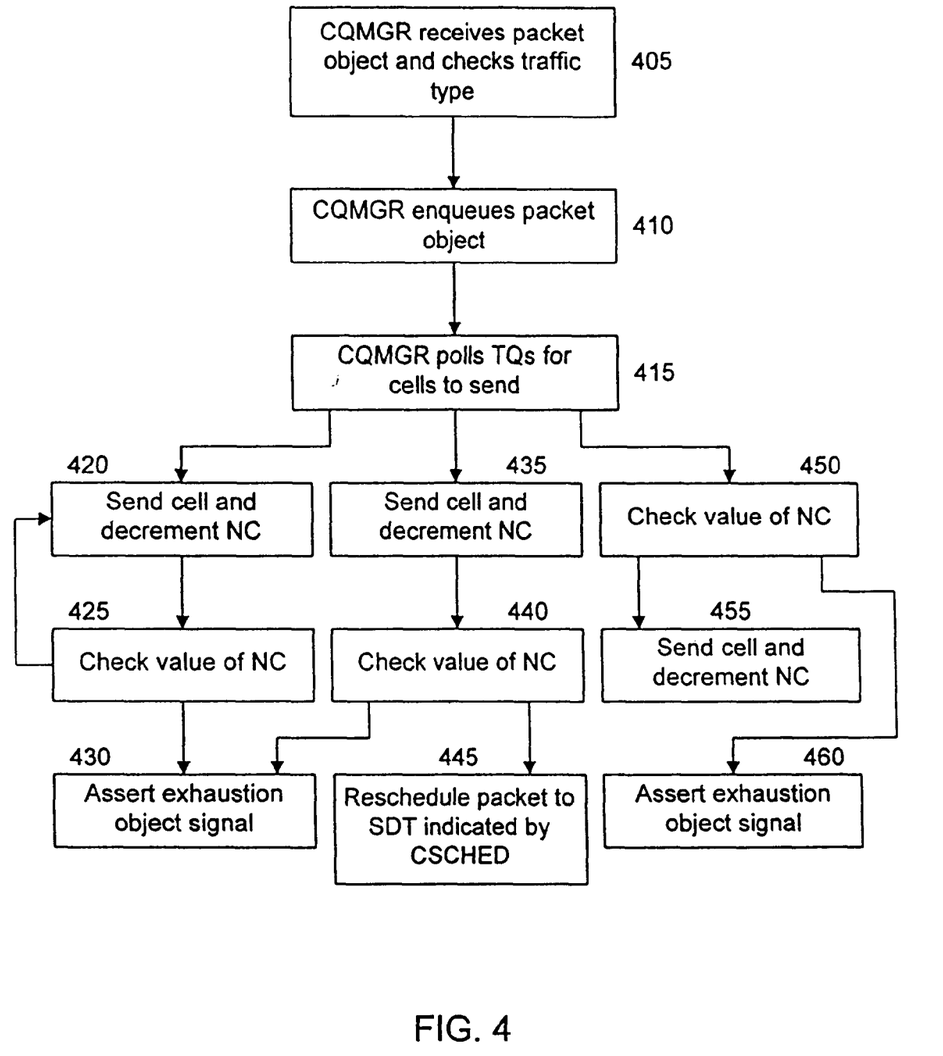
FIG. 4 is a flow diagram of a method used by the cell scheduler of FIG. 3, consistent with the present invention.

FIG. 4 shows a flow diagram, consistent with the present invention, that illustrates how cell scheduler 145 functions to process packet objects. Using timing relative to a synchronizing signal (inc_cell_time) from cell assembler 150, CQMGR 310 sends the correct cell of a packet object to cell assembler 150. If the sent cell is the last one of the packet object, CQMGR 310 asserts an exhaustion object signal that is received by either PLLQM 240 or PSTQM 250 in packet scheduler 140, depending on the packet scheduling type of the LCI. In response to the exhaustion signal, PLLQM 240 or PSTQM 250 dequeues the correct packet object for that LCI and sends it to CQMGR 310, which checks the traffic type of the received packet (step 405). However, if the particular PLLQM FIFO or PSTQM sorted tree corresponding to the exhaustion signal does not have an object, it would count it as a credit to future objects. This credit counting functionality maintains a count of the number of exhaustion signals received when no object is available to be sent. If an object is subsequently received by the PLLQM FIFO or PSTQM sorted tree having one or more credits, the object is sent immediately to CQMGR 310, and the credit count is decremented.

The received packet objects are placed by CQMGR 310 into the packet object FIFO for the LCI (step 410). If there are packet objects already in the packet object FIFO for the LCI, then one of CSCHEDs 330 and 340 has already scheduled the transmission time for the LCI and the received packet object is placed at the bottom of the FIFO. If the LCI was previously inactive (packet object FIFO was empty) and the LCI is UBR or VBR, then the LCI is placed on the corresponding UBR or VBR time queue. If the LCI is being placed on the VBR TQ, then the LCI is scheduled for transmission according to the calculation of one of CSCHEDs 330 and 340. If the LCI is being placed on the UBR TQ, then it is merely placed on the bottom of the queue.

The scheduling of the LCIs can be different for each of the different traffic types. For example, all CBR traffic can be scheduled in the CBR TQ (as determined by the NP) by the CQMGR 310, all VBR traffic can be scheduled by CSCHED 330 or 340 in conjunction with CQMGR 310, and all UBR traffic can be scheduled by CQMGR 310. The traffic type is determined using the LCI as a pointer into VBR scheduler memory 350, which contains a map of traffic type for each LCI.

For CBR traffic, the NP sets up a repetitive time division multiplex (TDM) schedule, which is a circular array of time slots. The NP, using an algorithm computed within the NP, fills in the time slots of the circular array with the number of the LCI for the CBR traffic to be transmitted.

CSCHEDs 330 and 340 can use, for example, a modified version of the standard GCRA to schedule all VBR traffic. CSCHEDs 330 and 340 calculate the earliest acceptable departure time for the first cell of the packet, termed the queue time (QT), and sends this information to CQMGR 310. CQMGR 310 reads the VBR TQ at the QT slot to see if there are any other packets scheduled for transmission at this time. If the time slot is empty, the packet's LCI is placed into the time slot. Specifically, the LCI is placed into head and tail pointers, which indicate the first and last LCI on a linked list queued at that time. If the time slot is not empty, however, the packet is threaded to the bottom of the list of LCIs at the time slot. The process of placing packets in the VBR TQ is called VBR threading and is discussed in more detail below. When the CBR TQ is implemented in the same manner as the VBR TQ, the threading process discussed below for VBR traffic can also apply to CBR traffic. All UBR traffic is placed by CQMGR 310 into one queue of UBR LCIs.

At the start of each cell time, CQMGR 310 reads the CBR and VBR TQ slot entries for the current time (CT) and checks the UBR queue for cells to send (step 415). CQMGR 310 takes a priority approach to sending traffic. For example, a CBR cell at any particular time slot has the highest priority, followed by VBR. If no CBR or VBR cell is being sent, then a UBR cell can be sent.

If the current time slot in the CBR TQ contains an LCI, this LCI is used as an index value to read its packet object information. If there is a valid packet to be sent out (i.e. number of cells (NC) not equal to zero), a cell of the valid packet is sent and the NC is decremented (step 420). After sending the cell of the valid packet, the value of the NC for that packet is checked (step 425). If NC is zero after sending the cell, CQMGR 310 asserts the exhaustion object signal indicating that another packet is requested (step 430).

In the event that there is a valid CBR cell to send, and there is also a VBR cell scheduled to be sent at the same cell time, then the VBR cell is moved (threaded) to the next time slot in the VBR time queue as described below. If no valid CBR packet is to be sent at the current time, however, then CQMGR 310 looks at the VBR TQ.

If the current time slot in the VBR TQ contains an LCI, this is an indication that there are VBR cells to be sent. If so, the next cell from the current packet is sent, and the NC is decremented to indicate the number of cells left in the packet to send (step 435). After sending the cell, the value of the NC for that packet is checked (step 440). If after sending the previous cell, the NC count is not zero or there are other packets on the packet object FIFO of that LCI, then the LCI is rescheduled by CSCHED 330 or 340 as described below with respect to VBR threading (step 445). This rescheduling process continues until all cells of the LCI have been sent. If NC is equal to zero, meaning that all cells in the current packet have been sent, then the exhaustion object signal is asserted to packet scheduler 140 (step 430), requesting a new packet object for that LCI's packet object FIFO.

If there are no CBR or VBR cells to send at the current time, CQMGR 310 determines if there is an LCI on the UBR queue. If so, a cell of the UBR packet is sent out, and NC is decremented (step 455). If NC is zero after being decremented, the exhaustion object signal is asserted (step 460). If no other packets remain on the LCI's packet object FIFO, the LCI is taken off the UBR queue. Otherwise, the LCI is placed at the bottom of the queue. This process is then repeated for each cell time.

Figure 5:
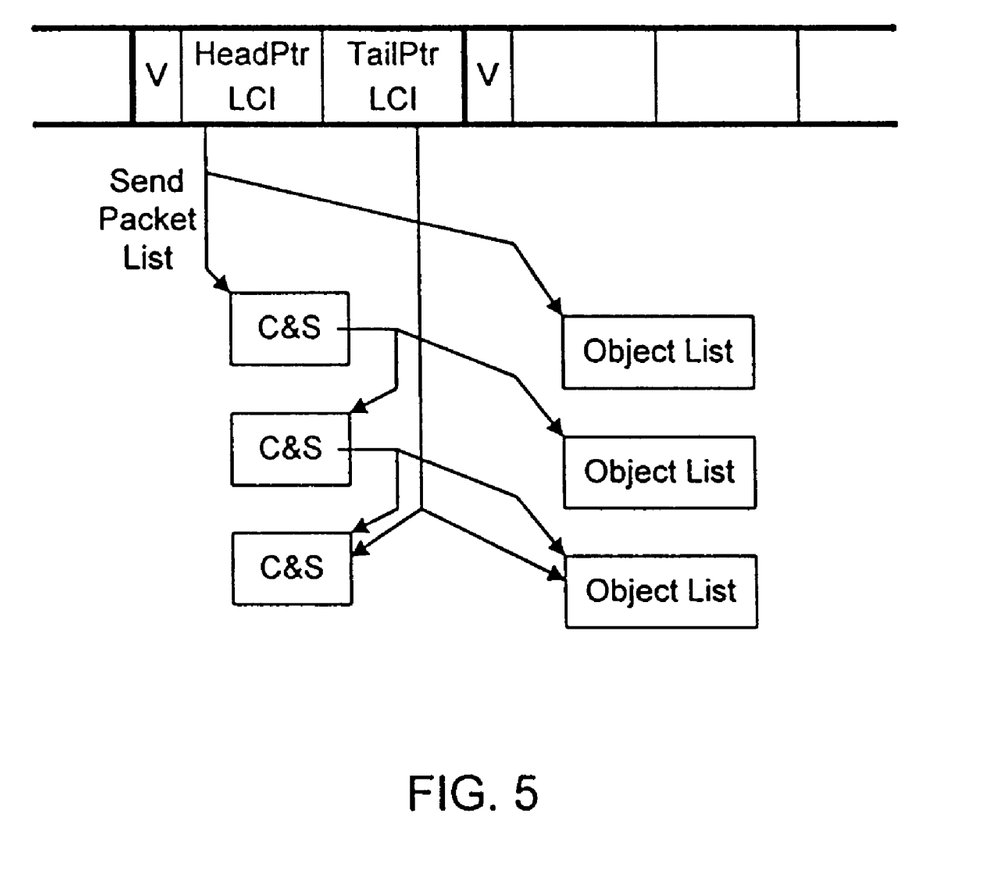
FIG. 5 is a diagram of a VBR time queue, consistent with present invention.

The process by which VBR packets are rescheduled to be sent at some future time is called VBR threading. As noted above, this process can also apply to other types of traffic, such as CBR traffic, when the corresponding time queue is implemented in the same manner as the VBR TQ. Threading the VBR list is one of the more complex aspects of CQMGR 310. It is necessary, however, to preserve the order of cell transmissions and their relation to cell time. All pointer changes are executed in a specific and deterministic sequence and within one cell time. As shown in FIG. 5, the VBR TQ has a list head and tail LCI, and a valid bit for each cell time slot. The LCIs are used as pointers to the control & status registers (C&S) and the packet object queues. Link pointers in the C&S registers provide chaining of the LCIs. If a packet is in the VBR TQ, its number of cells NC to be sent must be (assumed to be) larger than zero.

Figure 6A:
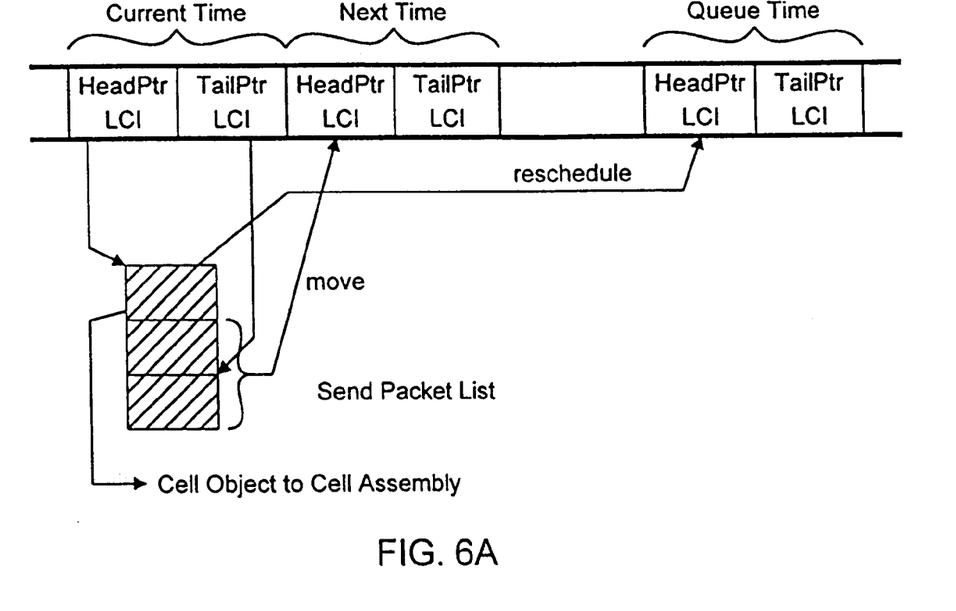
FIGS. 6A and 6B are diagrams of a scenario for a VBR threading process, consistent with the present invention.
Figure 6B:
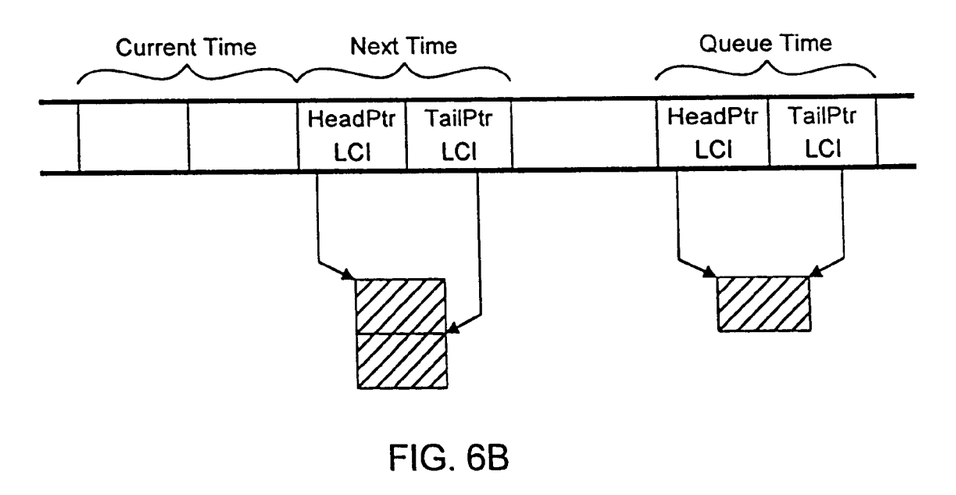

The following examples demonstrate several scenarios of threading send packet lists. The top figure shows the initial condition and the actions being taken. The bottom figure shows the resulting state of the lists. FIG. 6A shows a simple case, where there are three LCIs chained at CT. A cell from the packet object from the LCI at the head of the list is sent out to cell assembler 150. This LCI at the head of the list, assuming there are cells remaining, is then rescheduled to QT. Since the list at QT is empty, both head and tail pointers point to the moved LCI as shown in FIG. 6B. The remaining two LCIs at CT are moved to next time (NT), which is also an empty list. As a result, the pointers are set to point to the head and tail of the list being moved.

Figure 7A:
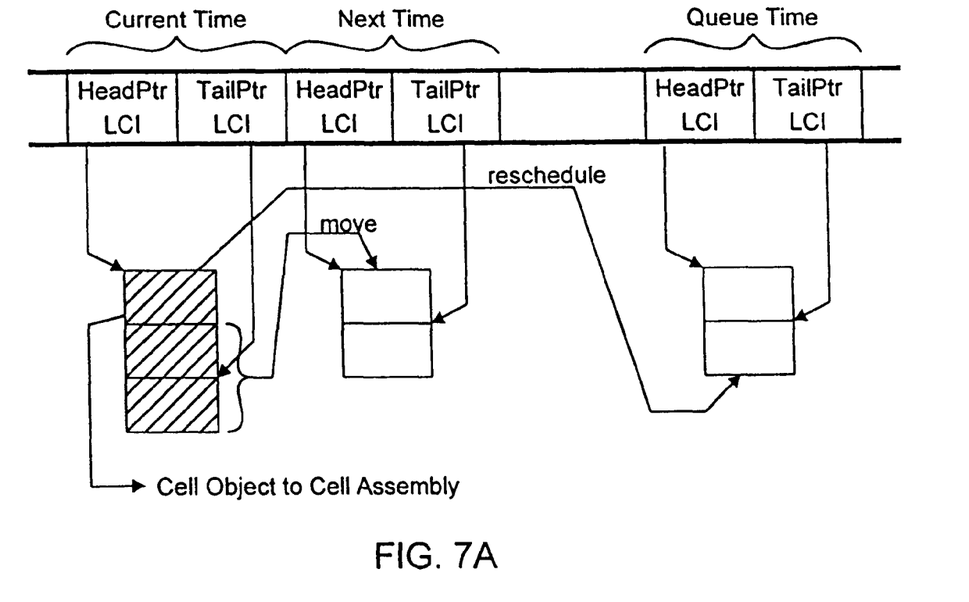
FIGS. 7A and 7B are diagrams of another scenario for the VBR threading process, consistent with the present invention.
Figure 7B:
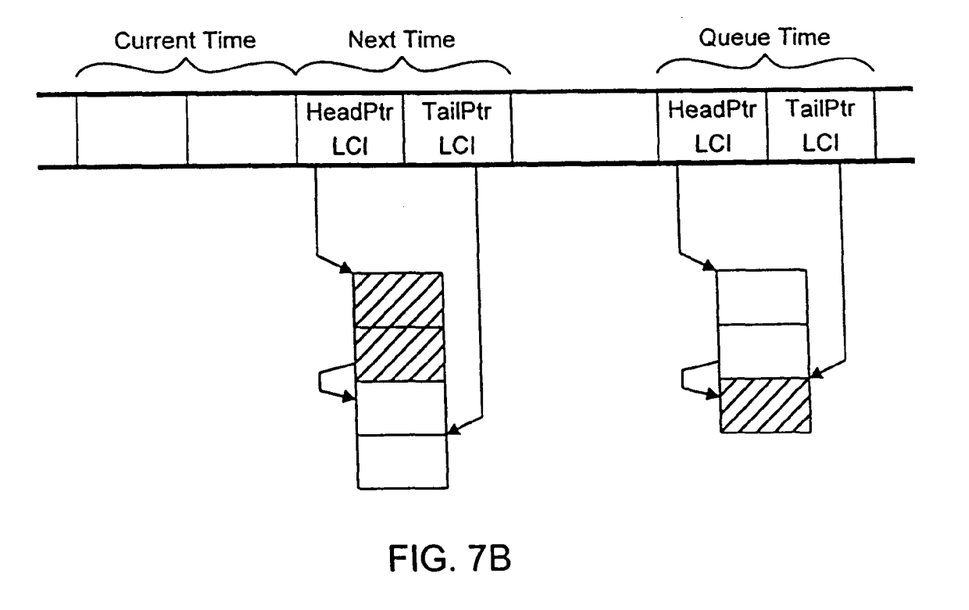

FIG. 7A shows a case where there are lists already at both QT and NT. After a cell object is sent out from the LCI at the head of the CT list, this LCI is threaded to the tail of the QT list. To thread this LCI to the tail of the QT list, both the VBR TQ tail pointer at QT and the C&S link pointer of the tail of the list at QT have to be modified to point to the LCI rescheduled to QT as shown in FIG. 7B. The remaining two LCIs at CT are moved to head of the list at NT. The head pointer in the VBR TQ at NT is modified to point to the head of the list moved to NT. The C&S link in the tail of the list being moved is modified to point to the head of the list already at NT.

Figure 8A:
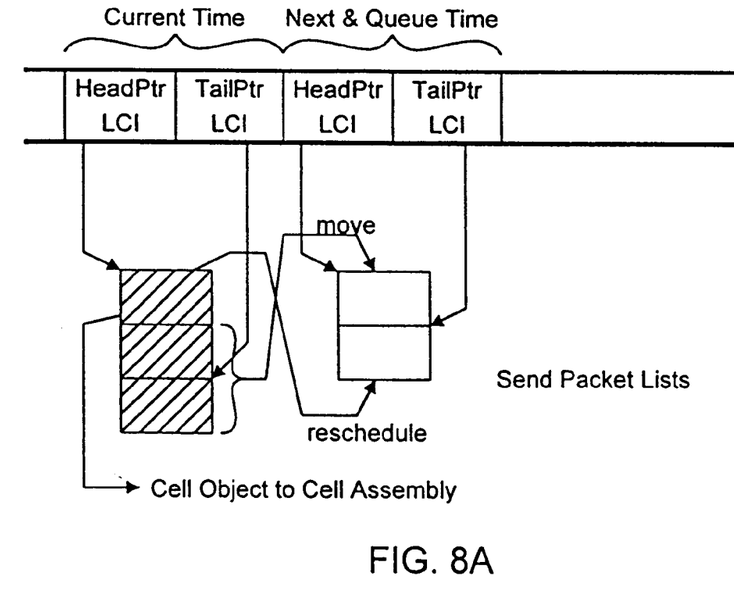
FIGS. 8A and 8B are diagrams of another scenario for the VBR threading process, consistent with the present invention.
Figure 8B:
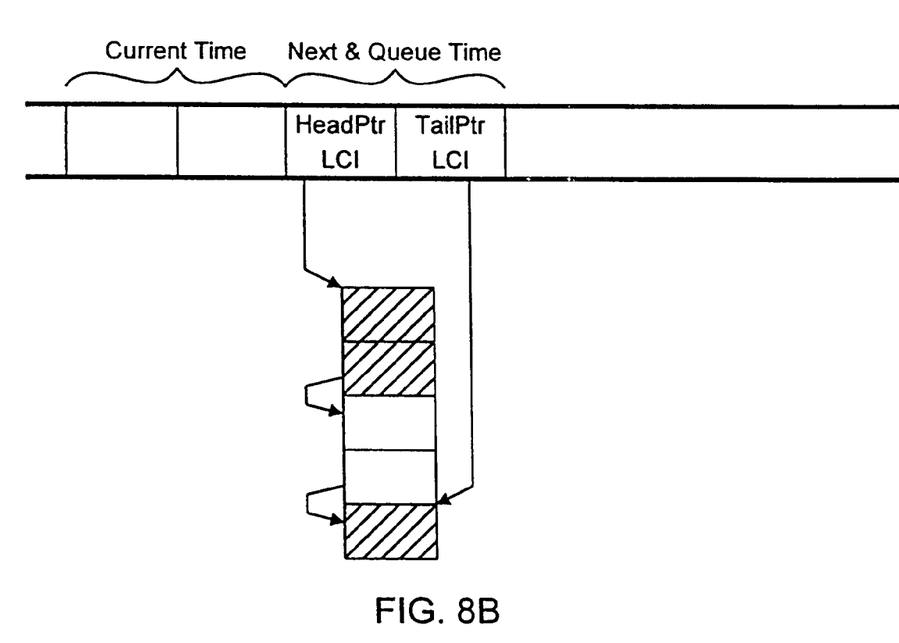

FIG. 8A shows a case, where QT and NT are equal, and there is already a list there. After a cell object is sent out from the LCI at the head of the CT list, this LCI is threaded to the tail of the NT list as shown in FIG. 8B. In addition, the remaining two packets at CT are moved to head of the list at NT. Both the VBR TQ head and tail pointers at QT, plus the C&S link in the tail of the list being moved and in the tail of the list at NT have to be modified.

Figure 9A:
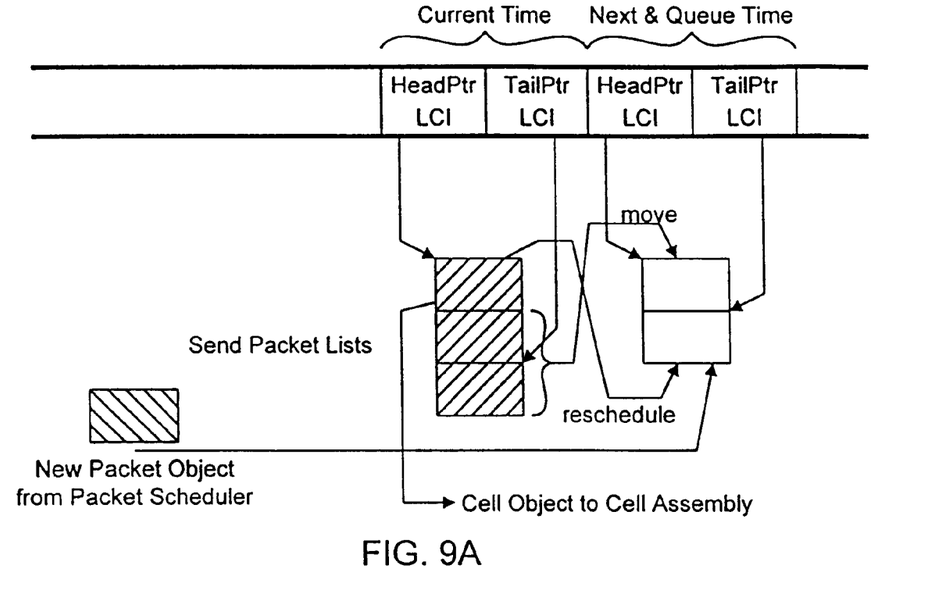
FIGS. 9A and 9B are diagrams of another scenario for the VBR threading process, consistent with the present invention.
Figure 9B:
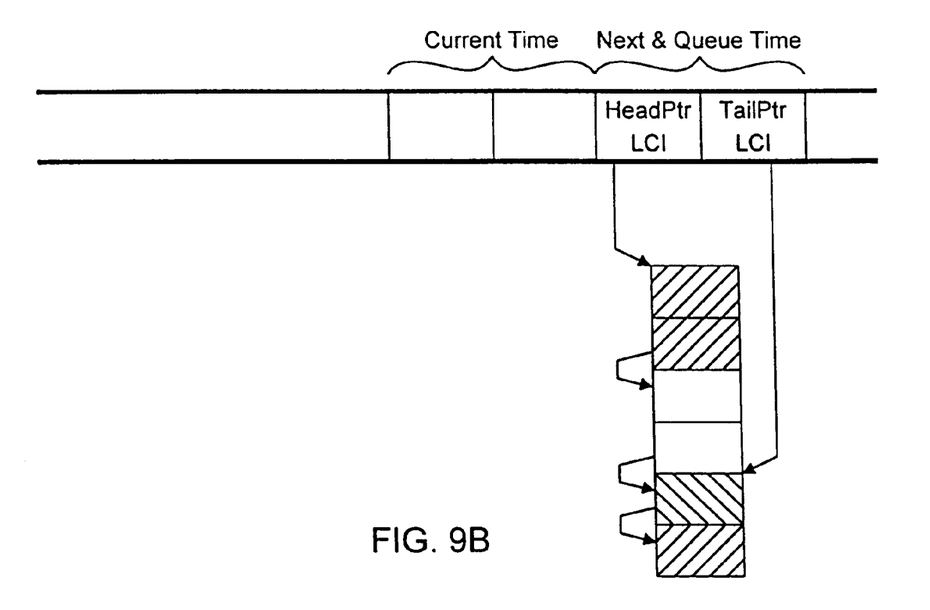

FIG. 9A builds on the case shown in FIG. 8A. As shown in FIG. 9A, the LCI of a new packet received from packet scheduler 140 is threaded onto the list at NT. This is a special case, where the new packet's QT is equal to NT. The new packet object's LCI ends up being threaded between the existing list and the packet that is being rescheduled from CT as shown in FIG. 9B.

When calculating the QTs for VBR packet objects, the following parameters are used: a peak rate increment (Ip) representing the minimal inter-cell spacing at a peak cell rate; a sustained-rate increment (Is) representing the minimal inter-cell spacing at a sustained cell rate; and Is–L, where L is approximately the burst length allowed in an LCI's cell stream. These parameters are used to calculate a theoretical departure time (TDT) and a scheduled departure time (SDT), which are then used to determine QT.

Three values are calculated for each cell time for a cell n scheduled to be transmitted at CT that is rescheduled as cell n+1. These values include TDT(n+1), SDT(n+1), and QT(n+1). TDT(n+1) is the theoretical departure time according to the sustained rate for cell n+1. SDT(n+1) is the scheduled departure time for cell n+1, and is the earliest legal time in which cell n+1 may be sent. A legal time is one that is in conformance with both GCRAs of CSCHED 330 or 340, where each GCRA calculates one of the sustained rate and the peak rate. Finally, QT(n+1) is the queue time for cell n+1 and accounts for the possibility that SDT(n+1 ) may be fractional or may be earlier than the next time slot associated with the LCI's output port, i.e., CT+1.

The following formulas are used to calculate TDT(n+1), SDT(n+1), and QT(n+1):

$$TDT(n+1)=TDT(n)+Is; \quad (1)$$

$$SDT(n+1)=\max[(TDT(n)+Is-L), (SDT(n)+Ip)]; \quad (2)$$

$$QT(n+1)=\max[(CT+1,4'h0), (clng(SDT(n+1))]. \quad (3)$$

The max( ) function is a comparison of values which takes into consideration that the quantities being compared can wrap around. It produces the later of the two quantities, which may not be numerically larger due to the potential wrap around. The clng( ) function converts any fractional value to the next highest integer. Since TDT and SDT can be fractional values with, for example, the last four bits representing the fractional portion, and CT is an integer value, the term CT+1,4'h0 represents CT+1 with four fractional bits of 0. After these values are calculated, the values for SDT and TDT are updated in memory for use in calculating the next set of values, and the value of QT(n+1) is used by CQMGR 310 in conjunction with CSCHEDs 330 and 340 to thread the rescheduled cell.

A cell of a newly received packet whose packet object FIFO was previously empty can use a slightly different algorithm. If a cell to be scheduled arrives a sufficiently long time after the transmission of the last cell, then TDT(n)+Is or SDT(n) +Ip could be before the next possible departure time. Such conditions should cause a loss of sustained bandwidth or a loss of peak bandwidth, respectively. To handle these conditions, the following equations are used:

$$TDT(n+1)=\max[(CT+1,4'h0), (TDT(n)+Is)]; \quad (4)$$

$$SDT(n+1)=\max[(TDT(n)+Is-L), (SDT(n)+Ip), (CT+1)]; \quad (5)$$

$$QT(n+1)=(clng(SDT(n+1))). \quad (6)$$

Using these equations ensures that QT(n+1) will not be before CT+1.

The VBR scheduling calculation process as described above works well as long as the LCI capacity is not over allocated. The primary function of CSCHEDS 330 and 340, as stated earlier, is to calculate the earliest acceptable time that a cell can be sent out (QT). This time is placed in the VBR TQ as an index, and when CT moves to that time slot in the VBR TQ, the cell would be transmitted or, in the worst case, moved to the next slot. The CSCHEDS 330 and 340 calculate QT using several internally stored values, which includes Is, Ip, and Is–L. These values can be different for each LCI depending upon the QoS characteristics selected for the LCI. These values are used by CSCHEDS 330 and 340 to calculate other internally stored values, such as TDT and SDT, which are in turn used by the algorithm to calculate the QT, as describe above.

A difficulty with this calculation of departure times is that comparisons are made to determine which of two values represents a later time using the max( ) function. As this is a continuing process and the values are represented by binary numbers of fixed width, these values will "wrap" after reaching a value of all 1s. To guarantee comparisons between two n bit numbers can be made properly, the numbers need to be within $2^{n-1}$ of each other. In the case of an inactive LCI or an oversubscribed line, the difference between CT and TDT or SDT can grow without bound.

To overcome this problem, a maintenance process is executed once every cell time. Every cell time, the maintenance process picks an LCI, in a sequential manner, and checks whether the stored TDT is within an allowable range from CT. The following algorithm is used to check the range.

if

$(CT-k)>TDT(n)$, then

$TDT(n)=CT-k+\max Is$, and

$SDT(n)=CT-k+\max Is$, where where k is greater than maxis; TDT(n) and SDT(n) are the last calculated values of TDT and SDT; k is preferably set to 32,768; and maxIs is preferably set to about 16,384. These values for K and maxIs are preferably used for an implementation using 16 bits for the integer part of the time values, although other values and other bit sizes can be used. Using k=32,768 instead of k=0 gives margin against unnecessarily reducing bandwidth if CT temporarily falls behind TDT due to LCI multiplexing. The maintenance process runs all the time and guarantees that the calculations for QT for each LCI will be made properly. Note that the comparison between (CT-k) and TDT(n) is analogous to the max function described above.

It will be apparent to those skilled in the art that various modifications and variations can be made without departing from the scope or spirit of the invention. Other embodiments of the invention will be apparent to those skilled in the art from consideration of the specification and practice of the embodiments of the invention disclosed herein. The specification and examples should be considered exemplary, with the true scope and spirit of the invention being indicated by the following claims and their full range of equivalents.

What is claimed is:

1. A method for scheduling the transmission of packet objects, each packet object having at least one cell and associated with a logical channel identifier (LCI) identifying the logical channel over which the packet object is being transmitted, comprising the steps of:

determining whether an LCI is scheduled to be transmitted at a current time;

transmitting at the current time a cell of a packet object corresponding to the LCI scheduled for transmission at the current time according to a priority associated with a traffic type of the LCI, at least one of the traffic types being a predetermined traffic type; and rescheduling an LCI of the predetermined traffic type to a queue time (QT), which corresponds to a transmission time later than the current time, when at least one cell remains for the LCI of the predetermined traffic type scheduled for transmission at the current time wherein the rescheduling step comprises:

determining a scheduled departure time (SDT) by calculating a first time as the sum of a theoretical departure time (TDT) and a first increment, calculating a second time as the sum of a previously calculated SDT and a second increment, and selecting one of the first and second times having the later time as the determined SDT; and setting the QT as the later time of the determined SDT and the transmission time immediately after the current time, wherein the next theoretical departure time is calculated as the sum of the prior value of TDT and a third increment.

2. The method of claim 1, wherein the step of rescheduling further comprises the substep of adding the rescheduled LCI of the predetermined traffic type to a list of LCIs of the predetermined traffic type scheduled for transmission at the QT.

3. The method of claim 2, wherein the step of adding includes the substep of placing the rescheduled LCI of the predetermined traffic type at the end of the list if other LCIs of the predetermined traffic type are already present in the list at the QT.

4. The method of claim 1, further comprising the steps of:

determining whether one or more LCIs of the predetermined traffic type other than the rescheduled LCI of the predetermined traffic, type were scheduled for transmission at the current time; and moving the determined LCIs of the predetermined traffic type to a next time list of LCIs of the predetermined traffic type scheduled for transmission immediately after the current time.

5. The method of claim 4, wherein the moving step includes the substep of placing the determined LCIs of the predetermined traffic type at the top of the next time list if LCIs of the predetermined traffic type are already included in the next time list.

6. The method of claim 1, wherein the step of determining a scheduled departure time includes the substep of setting the values of the first, second and third increments according to characteristics of the logical channel corresponding to the LCI of the predetermined traffic type.

7. The method of claim 1, wherein the predetermined traffic type is one of a variable bit rate (VBR) and a constant bit rate (CBR).

8. A method for scheduling the transmission of packet objects, each packet object having at least one cell and associated with a logical channel identifier (LCI) identifying the logical channel over which the packet object is being transmitted, comprising the steps of:

determining whether an LCI is scheduled to be transmitted at a current time;

transmitting at the current time a cell of a packet object corresponding to the LCI scheduled for transmission at the current time according to a priority associated with a traffic type of the LCI, at least one of the traffic types being a predetermined traffic type;

rescheduling an LCI of the predetermined traffic type to a queue time (QT), which corresponds to a transmission time later than the current time, when at least one cell remains for the LCI of the predetermined traffic type scheduled for transmission at the current time;

receiving a new packet object of the predetermined traffic type;

determining a scheduled departure time (SDI) for the LCI of the new packet object by calculating a first time as the sum of a theoretical departure time (TDT) and a first increment, calculating a second time as the sum of a previously calculated SDT and a second increment, and selecting one of the first time, the second time, and a next time, which corresponds to a transmission time immediately after the current time, having the later time as the determined SDT; and setting the QT of the LCI of the new packet object as the determined SDT, wherein the next theoretical departure time is determined by calculating a third time as the sum of the prior value of TDT and a third increment and selecting one of the first time and the next time having the later time as the next theoretical departure time.

9. The method of claim 8, wherein the step of rescheduling includes the substep of adding the rescheduled LCI of the predetermined traffic type to a list of LCIs of the predetermined traffic type scheduled for transmission at the QT.

10. The method of claim 9, wherein the step of adding includes the substep of placing the rescheduled LCI of the predetermined traffic type at the end of the list if other LCIs of the predetermined traffic type are already present in the list at the QT.

11. The method of claim 8, further comprising the steps of:

determining whether one or more LCIs of the predetermined traffic type other than the rescheduled LCI of the predetermined traffic, type were scheduled for transmission at the current time; and moving the determined LCIs of the predetermined traffic type to a next time list of LCIs of the predetermined traffic type scheduled for transmission immediately after the current time.

12. The method of claim 11, wherein the moving step includes the substep of placing the determined LCIs of the predetermined traffic type at the top of the next time list if LCIs of the predetermined traffic type are already included in the next time list.

13. The method of claim 8, wherein the predetermined traffic type is one of a variable bit rate (VBR) and a constant bit rate (CBR).

14. A computer system for scheduling the transmission cells of packet objects, each packet object including at least one cell and associated with a logical channel index (LCI) identifying the logical channel over which a packet object is to be transmitted, said computer system comprising:

at least one memory for storing the packet objects, for storing a queue time (QT) for each packet object, and for storing one of a plurality of traffic types for each packet object at least one of the traffic types being a predetermined traffic type;

a queue manager for enqueuing the packet objects into said memory; and at least one scheduling element for determining the transmission time for each LCI of the predetermined traffic type enqueued in said memory and for rescheduling an LCI of the predetermined traffic type having at least one cell that is not transmitted at its corresponding transmission time, wherein said queue manager includes:

means for using the LCI of a packet object as a pointer into the memory to identify the traffic type of a packet object;

means for identifying one or more LCIs having a transmission time corresponding to a current time; and means for sending a single cell of a constant bit rate (CBR) packet object identified as having a transmission time corresponding to the current time, for sending a single cell of a variable bit rate (VBR) packet object identified as having a transmission time corresponding to the current time if no CBR packet object has a transmission time corresponding to the current time, and for sending a single cell of an unscheduled bit rate (CBR) packet object identified as having a transmission time corresponding to the current time if neither a CBR packet object nor a VBR packet object has a transmission time corresponding to the current time.

15. The computer system according to claim 14, further comprising a network processor for predetermining the transmission time for each cell of constant bit rate (CBR) packet objects enqueued in the memory.

16. The computer system according to claim 14, wherein the predetermined traffic type is one of a variable bit rate (VBR) and a constant bit rate (CBR).

17. A computer system for scheduling the transmission cells of packet objects, each packet object including at least one cell and associated with a logical channel index (LCI) identifying the logical channel over which a packet object is to be transmitted, said computer system comprising:

at least one memory for storing the packet objects, for storing a queue time (QT) for each packet object, and for storing one of a plurality of traffic types for each packet object at least one of the traffic types being a predetermined traffic type;

a queue manager for enqueuing the packet objects into said memory; and at least one scheduling element for determining the transmission time for each LCI of the predetermined traffic type enqueued in said memory and for rescheduling an LCI of the predetermined traffic type having at least one cell that is not transmitted at its corresponding transmission time, wherein said scheduling element includes means for determining whether an LCI of the predetermined traffic type identified as having a transmission time corresponding to the current time includes one or more cells remaining after a cell has been transmitted at the current time; and means for calculating a queue time (QT), later dm the current time, for the determined LCI of the predetermined traffic type, said means for calculating a QT comprising:

means for determining a scheduled departure time (SDT) by calculating a first time as the sum of a previously calculated departure time and a first increment, calculating a second time as the sum of a previously calculated SDT and a second increment, and selecting one of the first and second times having the later time as the determined SDT; and means for setting the QT as the later time of the determined SDT and the transmission time immediately after the current time, wherein the next theoretical departure time is calculated as the sum of the prior value of TDT and a third increment.

18. The computer system according to claim 17, wherein the means for determining a scheduled departure time includes means for setting the values of the first, second and third increments according to characteristics of the logical channel corresponding to the LCI of the predetermined traffic type.

19. The computer system according to claim 17, further comprising a network processor for predetermining the transmission time for each cell of constant bit rate (CBR) packet objects enqueued in the memory.

20. The computer system according to claim 17, wherein the predetermined traffic type is one of a variable bit rate (VBR) and a constant bit rate (CBR).

21. A computer system for scheduling the transmission cells of packet objects, each packet object including at least one cell and associated with a logical channel index (LCI) identifying the logical channel over which a packet object is to be transmitted, said computer system comprising:

at least one memory for storing the packet objects, for storing a queue time (QT) for each packet object, and for storing one of a plurality of traffic types for each packet object at least one of the traffic types being a predetermined traffic type;

a queue manager for enqueuing the packet objects into said memory;

at least one scheduling element for determining the transmission time for each LCI of the predetermined traffic type enqueued in said memory and for rescheduling an LCI of the predetermined traffic type having at least one cell that is not transmitted at its corresponding transmission time;

means for receiving a new packet object of the predetermined traffic type;

means for determining a scheduled departure time (SDT) for the LCI of the new packet object by calculating a first time as the sum of a theoretical departure time (TDT) and a first increment, calculating a second time as the sum of a previously calculated SDT and a second increment, and selecting one of the first time, the second time, and a next time, which corresponds to a transmission time immediately after the current time, having the later time as the determined SDT; and means for setting a queue time (QT) of the LCI of the new packet object as the determined SDT, wherein the next theoretical departure time is determined by calculating a third time as the sum of the prior value of TDT and a third increment and selecting one of the third time and the next time having the later time as the next theoretical departure time.

22. The computer system according to claim 21, further comprising a network processor for predetermining the transmission time for each cell of constant bit rate (CBR) packet objects enqueued in the memory.

23. The computer system according to claim 21, wherein the predetermined traffic type is one of a variable bit rate (VBR) and a constant bit rate (CBR).

* * * * *